Patented Mar. 11, 1930

1,750,160

UNITED STATES PATENT OFFICE

TENNEY L. DAVIS, OF NORWELL, MASSACHUSETTS, ASSIGNOR OF ONE-HALF TO WALTER O. SNELLING, OF ALLENTOWN, PENNSYLVANIA

COMPOUND OF COBALT CYANATE WITH A TERTIARY BASE

No Drawing.    Application filed April 16, 1928. Serial No. 270,575.

My invention relates to reaction products of cobalt cyanate with a tertiary base and to methods of obtaining new chemical compounds by the reaction of cobalt cyanate with a tertiary base such as pyridine or quinoline. One of the objects of my invention is the preparation from pyridine and quinoline of new compounds useful in the preparation of temperature-indicating solutions.

I have discovered that when a tertiary base such as pyridine or quinoline is slowly added, preferably with stirring, to an aqueous solution of cobalt cyanate, there are formed compounds not previously known or prepared, and having unique and valuable properties.

As an example of my present invention I will describe a method which I may employ in the preparation of cobalt pyridine cyanate in solid form. One molecular equivalent of cobalt chloride is preferably dissolved in water and the solution is mixed with a solution of two molecular equivalents of potassium cyanate similarly dissolved in water. The deep blue solution resulting from the mixing of the solutions of cobalt chloride and potassium cyanate contains cobalt cyanate. To this deep blue solution I now slowly add pyridine, preferably with vigorous agitation. Upon the addition of pyridine, a precipitate of blue color begins to form, but upon further addition of pyridine the color of this precipitate gradually changes to pink. I prefer to continue to add pyridine until a slight excess is present, as evidenced by the pink color of the precipitate. This pink precipitate is cobalt pyridine cyanate, and may be obtained from the solution in solid crystalline condition by extraction with a suitable solvent. I prefer to employ chloroform as the solvent, preferably extracting twice with fresh portions of chloroform. The chloroform solution is conveniently freed from any droplets of water that may be present by filtering through a porous medium previously wet with chloroform. In the preparation of small amounts of cobalt pyridine cyanate, a piece of filter paper previously wet with chloroform forms a convenient means of separating any water present from the chloroform solution.

The chloroform solution of cobalt pyridine cyanate is next allowed to evaporate, either spontaneously or by very gentle warming, and upon the evaporation of the chloroform there is left reddish crystals of cobalt pyridine cyanate. These red crystals are stable in an atmosphere saturated with pyridine, and may conveniently be kept in a desiccator or other vessel in which some sticks of caustic potash and a small quantity of pyridine are kept in separate containers, for the purpose of maintaining the atmosphere in contact with the crystals of cobalt pyridine cyanate substantially dry with respect to water but substantially saturated with respect to pyridine.

By slowly adding quinoline to an aqueous solution formed by the reaction of one molecular equivalent of cobalt chloride with two molecular equivalents of potassium cyanate, in an analogous manner to that above described for the preparation of cobalt pyridine cyanate, I can obtain cobalt quinoline cyanate in aqueous solution, and by extraction with chloroform or other suitable solvent, I can obtain solutions of cobalt quinoline cyanate substantially free from water, but cobalt quinoline cyanate does not readily crystallize, and I prefer to prepare and utilize cobalt quinoline cyanate in solution as indicated.

Although in describing the preparation of these new compounds of cobalt cyanate with a tertiary base I have referred to the use of cobalt chloride and potassium cyanate as my raw materials, it will of course be understood that any other suitable salt of cobalt and any other suitable cyanate may be used, or that cobalt cyanate prepared in any other convenient manner than that above described may be utilized in the preparation of my new bodies of cobalt cyanate with pyridine and quinoline. My present invention relates to the new bodies cobalt quinoline cyanate and cobalt pyridine cyanate, and to the methods of their preparation in aqueous solution and in crystalline condition and is of course independent of the means employed to obtain cobalt cyanate, which is a known body. However, I find that the reaction in aqueous solution of one molecular equivalent of cobalt chloride (or other convenient salt of cobalt) and two molecular equivalents of potassium cyanate (or other convenient cyanate) forms a simple, and inexpensive method of preparing cobalt cyanate in dissolved condition and particularly suitable for reaction with a tertiary base such as pyridine or quinoline as above described.

Cobalt pyridine cyanate is relatively insoluble in carbon tetrachloride and in carbon bisulfide, but it is readily soluble in chloroform, benzene, alcohol and acetone, and is moderately soluble in toluene and xylene. Cobalt quinoline cyanate is in general soluble in the same solvents which dissolve cobalt pyridine cyanate.

Although in these specifications I have referred to cobalt pyridine cyanate and to cobalt quinoline cyanate as though each of these bodies were distinct and individual chemical entities, I wish to point out that the chemical behaviour of these bodies indicates the probability that each of them represents not a single compound of definite chemical composition, but rather a series of compounds varying in the amount of combined pyridine. Thus red cobalt pyridine cyanate, for example, when exposed to an atmosphere substantially free from pyridine tends to slowly lose pyridine, with change of color from red to blue, but chemical analysis shows that even the blue material remaining after the loss of pyridine as above indicated is still cobalt pyridine cyanate, the difference between the red cobalt pyridine cyanate and the blue cobalt pyridine cyanate being a matter of the amount of pyridine which is present in combined condition in the complex molecule.

As the unique and valuable properties of cobalt pyridine cyanate (and likewise of cobalt quinoline cyanate) appear to be connected with this peculiar behaviour of variable combination between cobalt cyanate and a tertiary base, I wish it to be understood that by cobalt pyridine cyanate I do not wish to be limited to either the red or to the blue variety, and that this term as herein used is to be understood as comprehending the new series of inter-related bodies of cobalt cyanate and pyridine which I have discovered, and that similarly by cobalt quinoline cyanate it is intended to comprehend the new series of inter-related bodies of cobalt cyanate and quinoline which are analogous to the corresponding compounds of cobalt cyanate and pyridine.

Although I have described in these specifications specific embodiments of my present invention, it is to be understood that I wish to broadly claim such variations as fall within the recognized range of equivalents, and that my invention is not to be limited except as indicated in the appended claims.

I claim:

1. As a new chemical compound, a reaction product of cobalt cyanate with a tertiary base.

2. As a new product, a cobalt pyridine cyanate.

3. The process of preparing a compound of cobalt cyanate with a tertiary base which comprises contacting a tertiary base with a solution of cobalt cyanate.

4. The process of preparing a compound of cobalt cyanate with pyridine which comprises contacting pyridine with a solution of cobalt cyanate.

In testimony whereof, I have hereunto subscribed my name this seventh day of April, 1928.

TENNEY L. DAVIS.